United States Patent [19] … Ishida et al.

[11] Patent Number: 4,945,507
[45] Date of Patent: Jul. 31, 1990

[54] OVERFLOW CORRECTION CIRCUIT

[75] Inventors: Ryuji Ishida; Toyoo Kiuchi, both of Tokyo, Japan

[73] Assignee: NEC Corporation, Tokyo, Japan

[21] Appl. No.: 364,478

[22] Filed: Jun. 12, 1989

[30] Foreign Application Priority Data

Jun. 10, 1988 [JP] Japan ................................. 63-144065

[51] Int. Cl.$^5$ .............................................. G06F 11/00
[52] U.S. Cl. .................................. 364/737; 364/736.5
[58] Field of Search ...................... 364/737, 748, 736.5, 364/761

[56] References Cited

U.S. PATENT DOCUMENTS

| 4,366,548 | 12/1982 | Kregness et al. | 364/737 X |
| 4,528,640 | 7/1985 | Criswell | 364/737 |
| 4,719,589 | 1/1988 | Tanaka | 364/737 X |
| 4,779,220 | 10/1988 | Nukiyama | 364/748 |

*Primary Examiner*—Gary V. Harkcom
*Assistant Examiner*—Tan V. Mai
*Attorney, Agent, or Firm*—Foley & Lardner, Schwartz, Jeffery, Schwaab, Mack, Blumenthal & Evans

[57] ABSTRACT

An overflow correction circuit is coupled to receive an output of an arithmetic operation circuit having first and second data inputs. The first data input is connected to an internal data bus so as to receive data to be subjected to an arithmetic operation, and the output of the arithmetic operation circuit outputs a result of arithmetic operation. The overflow correction circuit comprises a selector having a first input connected to receive the result of arithmetic operation from the arithmetic operation circuit and a second input and an output, a corrected value generating circuit having an output connected to the second input of the first selector, an overflow detection circuit coupled to receive the output of the arithmetic operation circuit and for generating an overflow signal indicative of whether or not there occurs an overflow in the result of the arithmetic operation. The first overflow signal is supplied to the selector so as to control the first selector in such a manner that when the overflow signal does not indicate occurrence of the overflow, the selector outputs the output of the arithmetic operation circuit as its output and when the overflow signal indicates occurrence of the overflow, the selector outputs the output of the corrected value generating circuit as its output. There is provided an accumulator having an input connected to receive the output of the first selector and an output connected to the second data input of the arithmetic operation circuit.

10 Claims, 4 Drawing Sheets

OVERFLOW CORRECTION CIRCUIT

BACKGROUND OF THE INVENTION

1. Field of the Invention

The present invention relates to an arithmetic operation circuit, and more specifically to an overflow correction circuit for use in an arithmetic operation circuit.

2. Description of Related Art

In the field of audio technique, hitherto, an audio signal is often converted into a digital signal, and then, the digital audio signal is subjected to an arithmetic operation. If an overflow occurs in a result of the arithmetic operation, it has been necessary to supply a maximum or minimum value of the digital number to an internal bus, since the overflowed data itself is no longer an appropriate audio data.

In brief, when the result of the arithmetic operation is outputted to the internal bus, the result of the arithmetic operation is stored in an accumulator having an overflow margin in comparison with a data length of the internal bus, so that even if an overflow occurs in the course of the arithmetic operation, the overflowed data is retained or returned to an arithmetic operation unit without the intermediary of the internal bus. With this arrangement, the arithmetic operation can be ensured to have the accuracy corresponding to a data width of a bus within the arithmetic operation unit. For example, if the internal data bus has a bus width of 20 bits, and if an overflow margin of 4 bits is ensured within the arithmetic operation unit so that the arithmetic operation unit has a bus width of 24 bits, the arithmetic operation can have the accuracy of 24 bits, and furthermore, the internal data bus can have the accuracy of 20 bits which is equal to the maximum data width of the internal data bus.

On the other hand, if the data width within the arithmetic operation is 20 bits, the bit length of data to be treated has to be reduced to 16 bits at an input of the arithmetic operation unit so that there does not occur an overflow in the course of the arithmetic operation. This will result in the fact that the arithmetic operation unit itself can have only the accuracy of 16 bits.

Furthermore, when a program to be used in the prior art arithmetic operation unit is prepared, the following method has been adopted:

(1) A program must be prepared so that the result of arithmetic operation will never overflow. Otherwise, a program must be prepared so that when the data overflowing into an overflow margin is outputted to the internal bus, a maximum or minimum data which can be expressed by the data width of the internal bus is outputted to the internal bus.

(2) A program must be prepared so that the overflow exceeding the overflow margin will never occur. Otherwise, a program is prepared so that when the overflow exceeding the overflow margin has occurred, a maximum or minimum data which can be expressed by the data width of the arithmetic operation unit (the data width of the internal bus + the overflow margin) is outputted to the accumulator.

In order to realize the above mentioned operation, the accumulator is required to have an overflow margin exceeding the data width of the internal bus, and there has been provided a flag indicative of whether or not the data overflows into the overflow margin. In this connection, the program is made such that when the data is stored in the accumulator, the overflow flag is set by a programmed operation, and when the data stored in the accumulator is outputted to the internal bus, the overflow flag is checked by a programmed operation so as to confirm whether or not the data to be outputted overflows into the overflow margin. If the data overflows into the overflow margin, the maximum or minimum value is set to the internal bus by a programmed operation. Furthermore, there have been required an instruction for discriminating whether or not the result of arithmetic operation overflows, and another instruction for setting correction data when the result of arithmetic operation overflows. These instructions will result in decrease of the operation speed of the arithmetic operation unit.

As mentioned hereinbefore, if the result of the arithmetic operation overflows to exceed the overflow margin, it becomes impossible to output an appropriate data as an audio data. Therefore, if the overflow correction is not made, the program must be made to ensure that the result of the arithmetic operation will never overflow to exceed the overflow margin.

SUMMARY OF THE INVENTION

Accordingly, it is an object of the present invention to provide an overflow correction circuit which has overcome the above mentioned defect of the conventional one.

Another object of the present invention is to provide an overflow correction circuit capable of correcting the overflow without decreasing the operation speed.

The above and other objects of the present invention are achieved in accordance with the present invention by an overflow correction circuit coupled to receive an output of an arithmetic operation circuit having first and second data inputs, the first data input being connected to an internal data bus so as to receive data to be subjected to an arithmetic operation, the output of the arithmetic operation circuit outputting a result of arithmetic operation, the overflow correction circuit comprising a selector having a first input connected to receive the result of arithmetic operation from the arithmetic operation circuit and a second input and an output, a corrected value generating circuit having an output connected to the second input of the selector, an overflow detection circuit coupled to receive the output of the arithmetic operation circuit and for generating an overflow signal indicative of whether or not there occurs an overflow in the result of the arithmetic operation, the overflow signal being supplied to the selector so as to control the selector in such a manner that when the overflow signal does not indicate occurrence of the overflow, the selector outputs the output of the arithmetic operation circuit as its output and when the overflow signal indicates occurrence of the overflow, the selector outputs the output of the corrected value generating circuit as its output, and an accumulator having an input connected to receive the output of the selector and an output connected to the second data input of the arithmetic operation circuit.

According to another aspect of the present invention, there is provided an overflow correction circuit coupled to receive an output of an arithmethic operation circuit having first and second data inputs, the first data input being connected to an internal data bus so as to receive data to be subjected to an arithmetic operation, the output of the arithmetic operation circuit outputting a result of arithmetic operation, the overflow correction circuit comprising an accumulator having an input connected to receive the output of the arithmetic operation circuit and an output connected to the second data input of the arithmetic operation circuit, a selector having a first input connected to receive the output of the accumulator and a second-input and an output, a corrected value generating circuit having an output connected to the second input of the selector, an overflow detection circuit coupled to receive the output of the arithmetic operation circuit and for generating an overflow signal indicative of whether or not the data held in the accumulator overflows to exceed a data length of the internal data bus, the overflow signal being supplied to the selector so as to control the selector in such a manner that when the overflow signal does not indicate occurrence of the overflow, the selector outputs the output of the accumulator as its output and when the overflow signal indicates occurrence of the overflow, the selector outputs the output of the corrected value generating circuit as its output.

DESCRIPTION OF THE PREFERRED EMBODIMENT

Figure 1:
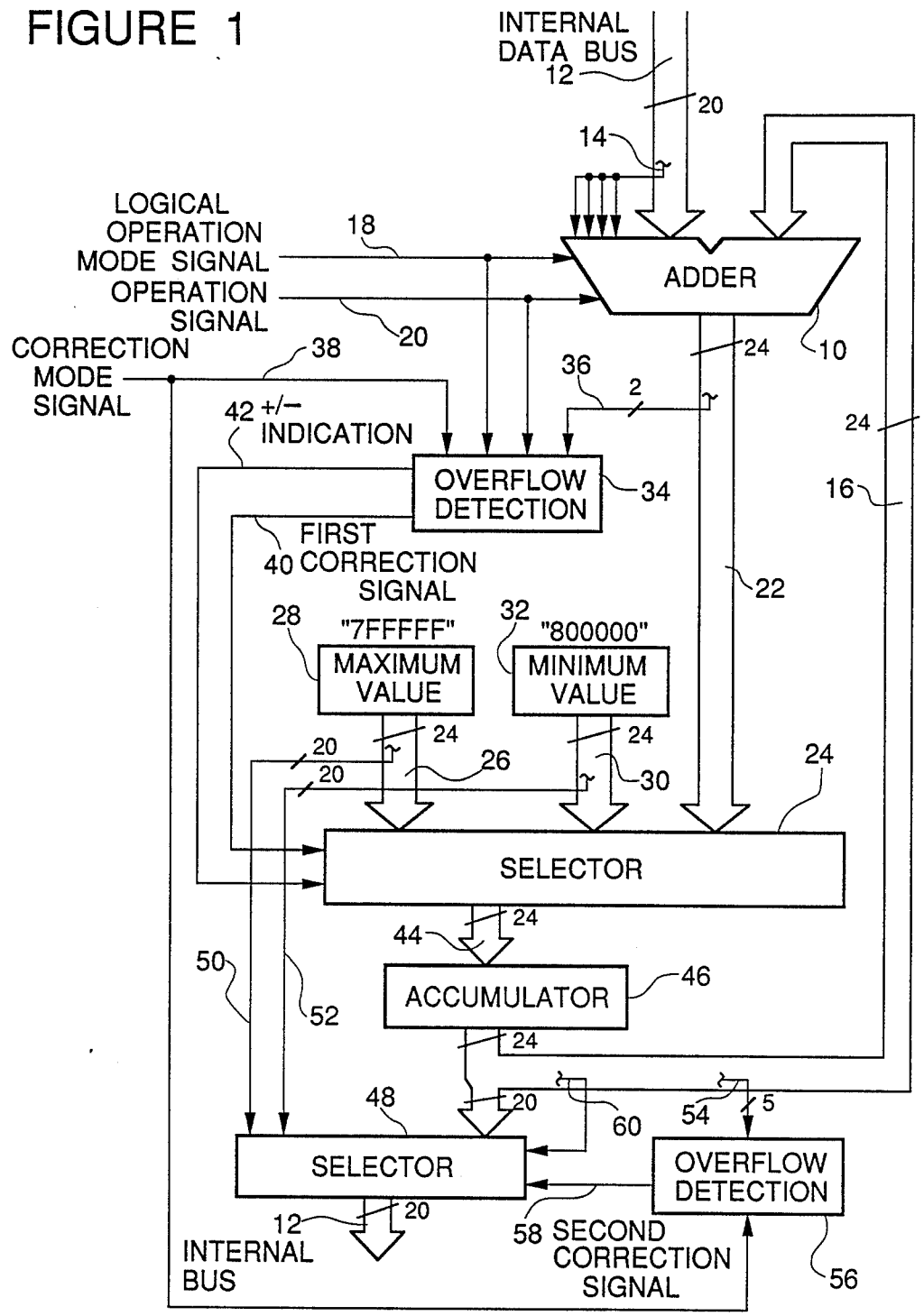
FIG. 1 is a block diagram of an arithmetic and logic circuit including a first embodiment of the overflow correction circuit in accordance with the present invention.

Referring to FIG. 1, there is shown a block diagram of an arithmetic and logic circuit including a first embodiment of the overflow correction circuit in accordance with the present invention. The arithmetic and logic circuit receives data of 20 bits expressed in a compliment, and outputs data of 20 bits expressed in a compliment. However, the arithmetic and logic circuit can treat therein data of 24 bits expressed in a compliment. Here, respective bits of a 20-bit data are called D19 D18, D17, ..., D1, D0 in the order named from its most significant bit, and respective bits of a 24-bit data are called D23, D22, D21, ..., D1, D0 in the order named from its most significant bit. In addition, the most significant bit (MSB) D19 of the 20-bit data and the most significant bit (MSB) D23 of the 24-bit data are respectively used as a sign bit indicative of a positive (+) or negative (−) sign of the data or number. Here, assume that the sign bit (MSB) of "0" is indicative of "+" and the sign bit of "1" shows "−".

The arithmetic and logic circuit includes an adder 10 which can treat a pair of input numerical data of 24 bits expressed in a compliment and can output the result of addition in the form of 24-bit data expressed in a compliment. The adder 10 has a first input of 24 bits, lower place 20 bits D19-D0 of the first 24-bit input being connected to an internal data bus 12 of 20 bits, and higher place 4 bits D23-D20 of the first 24-bit input being connected to commonly receive through a single bit line 14 the most significant bit D19 of the 20-bit data bus 12, namely the sign bit of the input 20-bit data. In other words, the higher place 4 bits of the first 24-bit input of the adder 10 is configured to receive extended bits derived from the sign bit of the input 20-bit data. The adder 10 also includes a second input of 24 bits connected to a bus 16 of 24 bits, which is in turn connected to an accumulator explained hereinafter. This adder 10 is connected to receive a logical operation mode signal 18 which indicates whether or not the logical operation should be executed, and an operation signal 20 which instructs the adder 10 to start its operation. The logical operation mode signal 18 is rendered inactive (low level) when a logical operation should be performed. Otherwise, the logical operation mode signal 18 is rendered active (high level). The adder 10 starts its arithmetic and logic operation in response to a rising edge of the operation signal 20.

A 24-bit output of the adder 10 is connected through a bus 22 of 24 bits to a first input of an selector 24. This selector also includes a second input connected through a bus 26 of 24 bits to a maximum value output circuit 28 which is configured to supply "7FFFFF$_H$". In this specification, the suffix H indicates a hexadecimal notation. The number "7FFFFF$_H$" is a maximum number of 24 bits expressible in the hexadecimal notation, since the MSB bit D23 of the 24 bits used as the sign bit is "0" to indicate "+" as mentioned above. In addition, the selector 24 includes a third input connected through a bus 30 of 24 bits to a minimum value output circuit 32 which is configured to supply "800000$_H$" which is a minimum number of 24 bits expressible in the hexadecimal notation, since the MSB bit D23 of the 24 bits used as the sign bit is "1" to indicate "−".

In addition, high place two bits D23 and D22 of the 24-bit output of the adder 10 are coupled to an overflow detection circuit 34 through a bus 36 of 2 bits. This overflow detection circuit 34 is connected to receive the logical operation mode signal 18 and the operation signal 20 as well as a correction mode signal 38 indicative of whether or not the overflow correction should be performed. On the other hand, the overflow detection circuit 34 generates a first correction signal 40 and a positive/negative (±) indication signal 42 to the selector 24. The first correction signal 40 indicates whether or not an overflow exceeding a data length of 24 bits occurs, and the ± indication signal 42 represents whether or not the overflow occurs in a positive direction or in a negative direction. When the first correction signal 40 is not active, the selector 24 selects the first input so that the output of the adder 10 is outputted as an output of the selector 24. On the other hand, when the first correction signal 40 is active, if the (±) indication signal 42 is indicative of "+", the selector 24 selects the second input so that the output of the maximum value output circuit 28 is outputted as the output of the selector 24. However, when the first correction signal 40 is active, if the (±) indication signal 42 is indicative of "−", the selector 24 selects the third input so that the output of the minimum value output circuit 32 is outputted as the output of the selector 24.

The output of the selector 24 is connected through a bus 44 of 24 bits to an accumulator 46, whose output is in turn coupled to the bus 16.

Therefore, a content of the accumulator 46 is supplied to the second input of the adder 10. In addition, lower place 20 bits D19 to D0 of the 24-bit content of the accumulator 42 are supplied to a firt input of another selector 48. This selector 48 includes a second input of 20 bits connected to receive through a 20-bit bus 50 higher place 20 bits D23 to D24 of the 24-bit output of the maximum value output circuit 28, and a third input of 20 bits connected to receive through another 20-bit bus 52 higher place 20 bits D23 to D4 of the 24-bit output of minimum value output circuit 32.

Furthermore, higher place five bits D23 to D19 of the 24-bit bus 16 (namely, the output of the accumulator 46) are inputted through a 5-bit bus 54 to another overflow detection circuit 56, which also receives the correction mode signal 38. This overflow detection circuit operates to discriminate whether or not there is an overflow exceeding an internal bus data length of 20 bits corresponding to that of the input bus 12 and hence to data to be outputted. If an overflow occurs, the overflow detection circuit 56 generates an active second correction signal 58 to the selector 48. Furthermore, the most significant bit D23 of the content of the accumulator 46, which is the sign bit indicative of the positive or negative of the numerical data held in the accumulator 46, is also inputted through a single bit line 60 to the selector 48. The selector 44 has an output of 20 bits connected to a 20-bit internal data bus 12.

When the second correction signal 58 outputted from the second overflow detection circuit 56 is not active, the selector 48 selects the first input so that the output of the accumulator 46 is outputted as an output of the selector 48. On the other hand, when the second correction signal 58 is active, if the sign bit (MSB) of the output of the accumulator 46 is "0" indicative of "+", the selector 46 selects the second input so that the higher place 20-bit portion of the maximum value output circuit 28 is outputted as the output of the selector 46. However, when the second correction signal 58 is active, if the sign bit (MSB) of the output of the accumulator 46 is "1" indicative of "−", the selector 48 selects the third input so that the higher place 20-bit portion of the minimum value output circuit 32 is outputted as the output of the selector 48.

As seen from the above, the internal bus 12 has 20 bits, and on the other hand, the accumulator 42 has an overflow margin of 4 bits in comparison with the internal bus 12 of the 20 bits.

Figure 2:
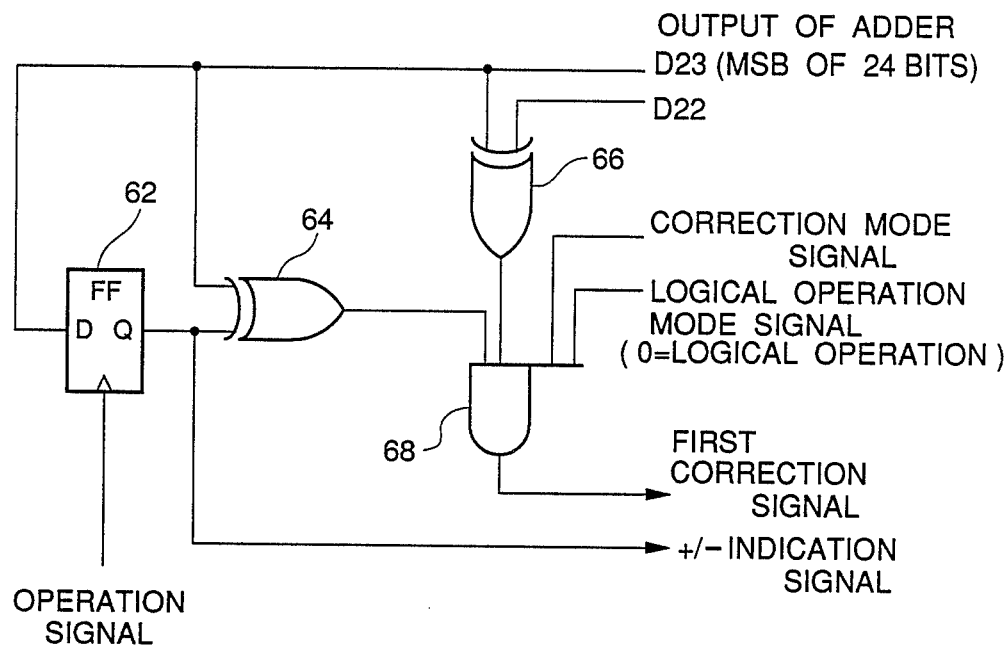
FIG. 2 is a logic diagram of the first overflow detection circuit included in the overflow correction circuit shown in FIG. 1.

Turning to FIG. 2, there is shown a logic diagram of the overflow detection circuit 34 shown in FIG. 1. The overflow detection circuit 34 includes a data latch 62 composed of a D-type flipflop, which has a data input connected to receive the MSB bit D23 of the output of the adder 10, and a clock (latch timing) input connected to the operation signal 20. For example, the data latch 62 latches an input data in response to a falling edge of the operation signal 20. An output Q of the data latch 62 is connected to a first input of a two-input exclusive-OR circuit 64, which has a second input connected to receive the MSB bit D23 of the output of the adder 10. The output Q of the data latch 62 gives the (±) indication signal 42.

In addition, the MSB bit D23 and the next higher place bit D22 of the output of the adder 10 are inputted to another two-input exclusive-OR circuit 66. Outputs of the two exclusive-OR circuits 64 and 66 are connected to first and second inputs of a four-input AND circuit 68, respectively. This AND circuit has a third input connected to receive the correction mode signal 38, and a fourth input connected to receive the logical operation mode signal 18. An output of the AND circuit 68 generates the first correction signal 40.

Figure 3:
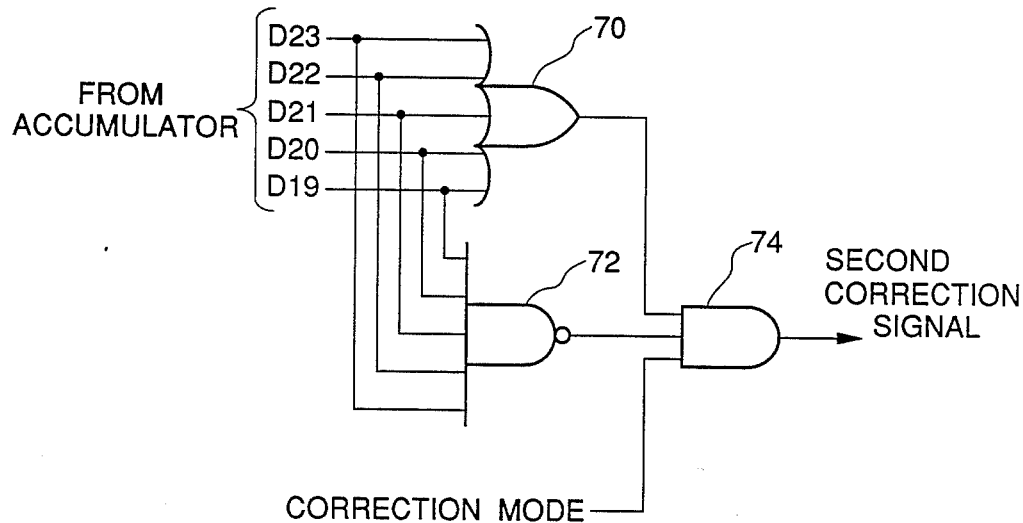
FIG. 3 is a logic diagram of the second overflow detection circuit included in the overflow correction circuit shown in FIG. 1.

Referring to FIG. 3, there is shown a logic diagram of the overflow detection circuit 56 shown in FIG. 1. The overflow detection circuit 56 includes a five-input OR circuit 70 and a five-input NAND circuit 72, each of which receives the higher place 5 bits D23–D19 of the 24-bit bus 16 (namely, of the 24-bit content of the accumulator 46). Outputs of the OR circuit 70 and the NAND circuit 72 are connected to a three-input AND circuit 74, which is connected to receive the correction mode signal 38 at a third input thereof.

Now, operation of the above mentioned first embodiment will be explained. In the circuit shown in FIG. 1, when the correction mode signal is active, the overflow detection circuit 34 operates to discriminate whether or not an overflow occurs in the output of the adder 10. If no overflow occurs, the overflow detection circuit 34 controls the selector 24 to cause it to output the output of the adder 10 to the accumulator 46. On the other hand, if an overflow occurs, the overflow detection circuit 34 controls the selector 24 to cause it to output the output of the maximum value output circuit 28 or the output of the minimum value output circuit 32 to the accumulator 46 in accordance with the direction of the overflow designated by the (±) indication signal 42.

Furthermore, when the content of the accumulator 46 should be outputted to the internal data bus 12, if the correction mode signal is active, the overflow detection circuit 56 operates to discriminate whether or not the content of the accumulator 46 overflows into the overflow margin of 4 bits from the data length of 20 bits. If no overflow occurs, the overflow detection circuit 56 controls the selector 48 to cause it to output the lower place 20 bits of the accumulator 46 to the internal data bus 12. On the other hand, if an overflow occurs, the overflow detection circuit 56 controls the selector 48 to cause it to output the higher place 20 bits of the maximum value output circuit 28 or the higher place 20 bits of the minimum value output circuit 32 to the internal data bus 12 in accordance with the direction of the overflow designated by the MSB or sign bit of the content of the accumulator 46 itself.

If the correction mode signal 38 is inactive, the overflow correction is not performed. Namely, the selector 24 ceaselessly outputs the output of the adder 10 to the accumulator 46, regardless of whether or not an overflow occurs in the output of the adder 10. In addition, the selector 48 ceaselessly outputs the lower place 20 bits of the accumulator 46 to the internal data bus 12, regardless of whether or not an overflow exceeding the data length of 20 bits occurs in the content of the accumulator 46.

Furthermore, even if the correction mode signal 38 is active (namely "1"), if the logical operation mode signal 18 is active ("0") to instruct the logical operation, the selector 24 is controlled by the overflow detection circuit 34 to output the output of the adder 10 to the accumulator 46.

Now, assume that data "7F65AB$_H$" is retained in the accumulator 46. When this data is outputted to the internal bus 12, since the higher place five bits are composed of "01111", the overflow detection circuit 56 generates an active correction signal in the correction mode operation, as seen from FIG. 3. In addition, since the MSB bit of the content of the accumulator 46 is "0", the selector 24 operates to select the output of the maximum value output circuit 28, and to output the higher place 20 bits D23-D4 of the data "7FFFFF$_H$" to the internal bus 12.

If data "48C20$_H$" is outputted onto the internal data bus 12 and added to the data "7F65AB$_H$" in the accumulator 46 by action of the adder 10, the adder 10 outputs on the bus 22 the result of addition "83F1CB$_H$" (−"7F65AB$_H$"+"48C20$_H$"). Namely, the MSB bit D23 and the next higher place bit D22 of the output of the adder 10 will become "0" and "1", respectively, and therefore, the exclusive-OR circuit 66 shown in FIG. 2 outputs an active signal or a high level signal. On the other hand, the data latch 62 outputs a logical value of "0", since the latch 62 latches the MSB bit of the data "7F65AB$_H$" in the course of an operation in which the data "7F65AB$_H$" had been outputted to the accumulator 46. Therefore, the exclusive-OR circuit 64 outputs an active signal or a high level signal. Namely, a circuit composed of the data latch 62 and the exclusive-OR circuit 64 detects an inversion of the sign bit (MSB) of the data before and after the execution of the arithmetic operation. This inversion of the sign bit (MSB) of the data means occurrence of an overflow in the result of the arithmetic operation.

In addition, the correction mode signal 38 is active (high level), and the logical operation mode signal 18 is also active (high level), since the addition operation to be executed is not a logical operation. Accordingly, the output of the AND circuit 68 namely the first correction signal 40 is rendered active (high level). On the other hand, since the output of the data latch 62, namely the ± indication signal 42, is of "0" as mentioned above, the selector 24 selects the output of the maximum value output circuit 28, so that the data "7FFFFF$_H$" is outputted to the accumulator 46.

The above mentioned example of the operation is directed to the case in which an overflow occurs in a positive (+) direction. If an overflow occurs in a negative (−) direction, the selectors 24 and 48 will select the output of the minimum value output circuit 32.

In the above mentioned first embodiment of the overflow correction circuit, if the circuit is set to take the overflow correction mode, the cicruit operates to detect whether or not an overflow occurs, and then, if an overflow occurs, the circuit operates to automatically correct the overflow without setting a corrected data on the basis of a programmed operation.

The prior art program-operated system had to have been decreased in bit accuracy, since a program must have been assembled to ensure that no overflow will absolutely occur. This is for the reason that, even if an overflow occurs in the data, since the overflowed data effectively functions as an audio data, namely as an error audio data, no overflow will absolutely occur. To the contrary, the above mentioned overflow correction circuit can correct the overflow without decreasing the bit accuracy.

Figure 4:
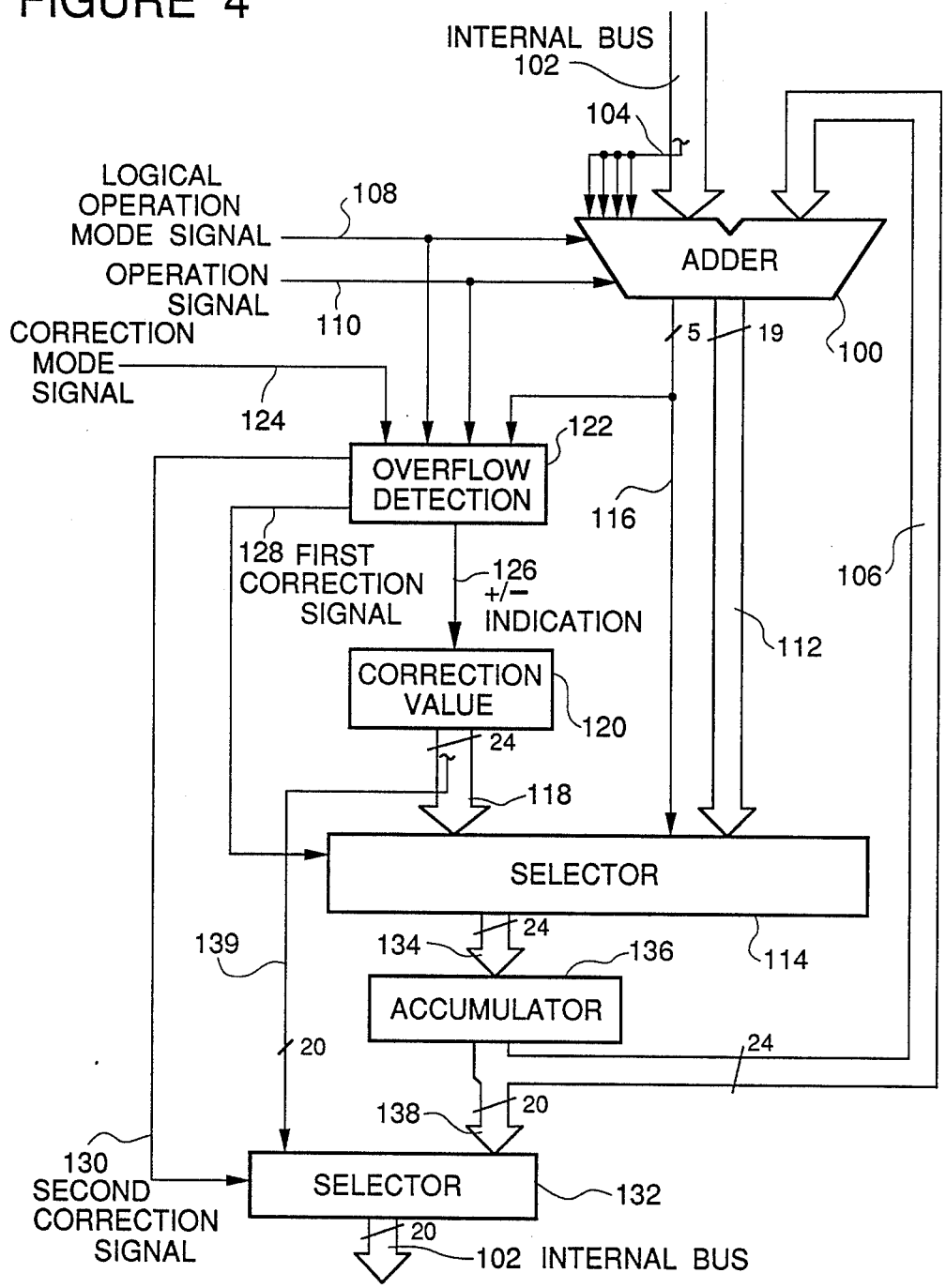
FIG. 4 is a block diagram of an arithmetic and logic circuit including a second embodiment of the overflow correction circuit in accordance with the present invention.

Referring to FIG. 4, there is shown a block diagram of an arithmetic and logic circuit including a second embodiment of the overflow correction circuit in accordance with the present invention. Similarly to the first embodiment shown in FIG. 1, the arithmetic and logic circuit receives data of 20 bits expressed in a compliment, and outputs data of 20 bits expressed in a compliment. However, the arithmetic and logic circuit can treat therein data of 24 bits expressed in a compliment. In addition, respective bits of each data will be expressed similarly to the first embodiment.

The arithmetic and logic circuit includes an adder 100 which can treat a pair on input numerical data of 24 bits expressed in a compliment and can output the result of addition in the form of 24-bit data expressed in a compliment. The adder 100 has a first input of 24 bits, lower place 20 bits D19-D0 of the first 24-bit input being connected to an internal data bus 102 of 20 bits, and higher place 4 bits D23-D20 of the first 24-bit input being connected to commonly receive through a single bit line 104 the most significant bit D19 of the 20-bit data bus 102, namely the sign bit of the input 20-bit data. The adder 100 also includes a second input of 24 bits connected to a bus 106 and 24 bits, which is in turn connected to an accumulator explained hereinafter. This adder 100 is connected to receive a logical operation mode signal 108 which indicates whether or not the logical operation should be executed. The logical operation mode signal 108 is rendered inactive (low level) when a logical operation should be performed. Otherwise, the logical operation mode signal 108 is rendered active (high level). This adder 100 is also connected to receive an operation signal 110 which instructs the adder 100 to start its operation. The adder 100 starts its arithmetic and logic operation in response to a rising edge of the operation signal 110.

Lower place 19 bits D18-D0 of a 24-bit output of the adder 100 are connected through a bus 112 of 19 bits to corresponding lower place 19 bits D18-D0 of a first 24-bit input of an selector 114. In addition, higher place 5 bits D23-D·of the output of the adder 100 are connected through a bus 116 of 5 bits to corresponding higher place 5 bits D23-D19 of the first input of the selector 114. The selector also includes a second input connected through a bus 118 of 24 bits to a corrected value generating circuit 120.

Furthermore, the higher place five bits D23-D·of the 24-bit output of the adder 10 are coupled to an overflow detection circuit 122. This overflow detection circuit 122 is connected to receive the logical operation mode signal 108 and the operation signal 110 as well as a correction mode signal 124 indicative of whether or not the overflow correction should be performed. On the other hand, the overflow detection circuit 122 generates a positive/negative (±) indication signal 126 to the corrected value generating circuit 120. The ± indication signal 126 represents whether or not the overflow occurs in a positive direction or in a negative direction. If the ± indication signal 126 represents the overflow of the positve direction, the corrected value generating circuit 120 generates a maximum value of 24 bits expressible in the hexadecimal notation mentioned hereinbefore. On the other hand, if the ± indication signal 126 represents the overflow of the negative direction, the corrected value generating circuit 120 generates a minimum value of 24 bits expressible in the hexadecimal notation mentioned hereinbefore.

The overflow detection circuit 122 also generates a first correction signal 128 to the selector 114. This first correction siganl 128 indicates whether or not there occurs an overflow exceeding a data length of 24 bits. When the first correction signal 128 is not active, the selector 114 selects the first input so that the output of the adder 10 is outputted as an output of the selector 114. On the other hand, when the first correction signal 40 is active, the selector 24 selects the second input so that the output of the corrected value generating circuit 120 is outputted as the output of the selector 114.

Furthermore, the overflow detection circuit 122 also generates a second correction signal 130 to another selector 132. This second correction signal 130 indicates whether or not there occurs an overflow exceeding a data length of 20 bits.

The first selector 114 has an output of 24 bits connected through a 24-bit bus 134 to an accumulator 136, which in turn has an output of 24 bits connected to the bus 106 of 24 bits. Lower place 20 bits D19–D0 of the output of the accumulator 136 are coupled through a 20-bit bus 138 to a first 20-bit input of the second selector 132. This second selector 132 has a second 20-bit input connected through a 20-bit bus 139 to higher place 20 bits D23–D4 of the output of the corrected value generating circuit 120. A 20-bit output of the second selector 132 is coupled to the internal bus 102 of 20 bits. Thus, when the first correction signal 128 of the overflow detection circuit 122 is not active, the second selector 132 selects the first input so that the lower place 20 bits of the output of the accumulator 136 is outputted as an output of the selector 132. On the other hand, when the second correction signal 130 is active, the second selector 132 selects the second input so that the higher place 20 bits D23–D4 of the output of the corrected value generating circuit 120 is outputted as the output of the selector 132.

Figure 5:
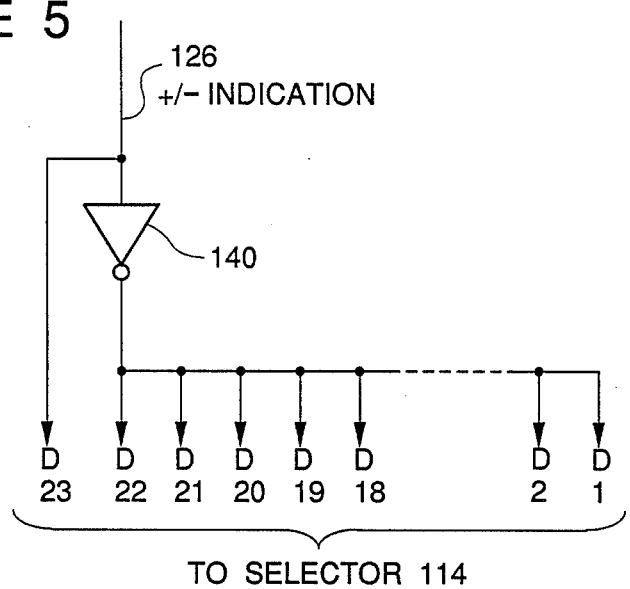
FIG. 5 is a logic diagram of the fixed value generating circuit included in the overflow correction circuit shown in FIG. 4.

Referring to FIG. 5, there is shown a logic circuit diagram of the corrected value generating circuit 120. This corrected value generating circuit 120 includes an inverter 140 having an input connected to receive the ± indication signal 126 outputted from the overflow detection circuit 122. An output of the inverter 140 is connected commonly to the bits D22–D0 of the 24-bit bus 118 excluding the MSB bit D23. The input of the inverter 140 is connected to the MSB bit D23 of the 24-bit bus 118. Thus, if the ± indication signal 126 is "0", the corrected value generating circuit 120 generates "7FFFFF$_H$", and if if the ± indication signal 126 is "1", the corrected value generating circuit 120 generates "800000$_H$".

Figure 6:
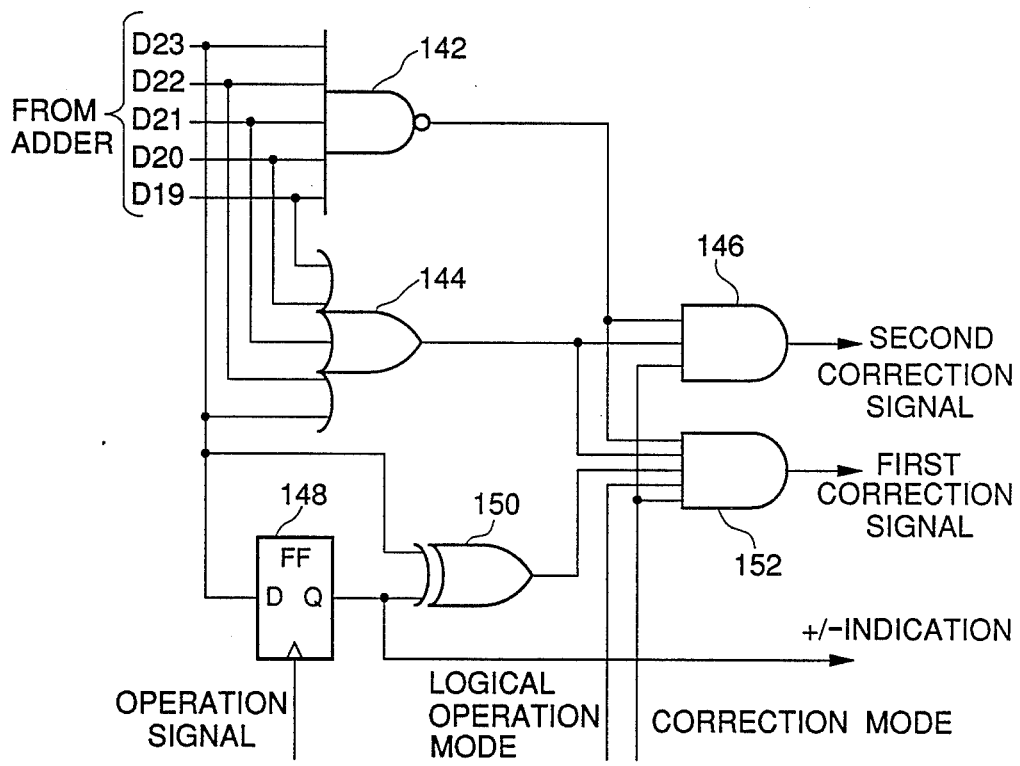
FIG. 6 is a logic diagram of the overflow detection circuit included in the overflow correction circuit shown in FIG. 4.

Turning to FIG. 6, there is shown a logic circuit diagram of the overflow detection circuit 122. The overflow detection circuit 122 includes a five-input NAND circuit 142 and a five-input OR circuit 144, each of which receives the higher place 5 bits D23–D19 of the 24-bit output of the adder 100. Outputs of the NAND circuit 142 and the OR circuit 144 are connected to a three-input AND circuit 146, which is connected to receive the correction mode signal 124 at a third input thereof. This AND circuit generates the second correction signal indicative of whether or not there occurs an overflow exceeding the data length of 20 bits. It will be noted that a circuit consituted of the NAND circuit 142, the OR circuit 144 and the AND circuit 146 substantially corresponds to the second overflow detection circuit 56 shown in FIG. 3.

The overflow detection circuit 122 also includes a data latch 148 composed of a D-type flipflop, which has a data input connected to receive the MSB bit D23 of the output of the adder 100, and a clock (latch timing) input connected to the operation signal 110. An output Q of the data latch 148 is connected to a first input of a two-input exclusive-OR circuit 150, which has a second input connected to receive the MSB bit D23 of the output of the adder 100. In addition, the output Q of the data latch 148 gives the (±) indication signal 126. It will be noted that a circuit composed of the data latch 148 and the exclusive-OR circuit 150 corresponds to the circuit composed of the data latch 62 and the exclusive-OR circuit 64, shown in FIG. 2.

The outputs of the NAND circuit 142, the OR circuit 144 and the exclusive-OR circuit 150 are connected to first to third inputs of a five-input AND circuit 152, respectively. Fourth and fifth inputs of the five-input AND circuit 152 are connected to receive the logical operation mode signal 108 and the correction mode signal 124, respectively. An output of the AND circuit 152 generates the first correction signal 128.

The circuit shown in FIG. 4 operates as follows: The overflow detection circuit 122 detects whether or not the output of the adder 100 overflows into the overflow margin. If the output of the adder 100 overflows into the overflow margin, the overflow detection circuit 122 generates the active second correction signal 130. In addition, the overflow detection circuit 122 detects whether or not the MSB bit of the output of the adder 100 has been inverted in the case that the output of the adder 100 overflows into the overflow margin. Thus, if the MSB bit is inverted, and if the output of the adder 100 overflows into the overflow margin, the overflow detection circuit 122 generates the active first correction signal 128.

The selector 114 selects either the output of the adder 100 or the output of the corrected value generating circuit 120 in accordance with the first correction signal 128. Namely, if the first correction signal 128 is not active, the selector 114 outputs the output of the adder 100. But, if the first correction signal 128 is active, the selector 114 outputs the output of the corrected value generating circuit 120. Furthermore, the selector 132 selects either the output of the accumulator 136 or the output of the corrected value generating circuit 120 in accordance with the second correction signal 130. Namely, if the second correction signal 130 is not active, the selector 132 outputs the lower place 20 bits D19–D0 of the output of the accumulator 136. But, if the second correction signal 130 is active, the selector 132 outputs the higher place 20 bits D23–D4 of the output of the corrected value generating circuit 120.

Other than the above mentioned operation, the second embodiment operates in the same manner as that of the first embodiment, and therefore, further explanation of the operation will be omitted.

As will be apparent from the above description, the overflow correction circuit in accordance with the present invention has hardware means for detecting whether or not there occurs an overflow exceeding an overflow margin, and hardware means for causing a maximum or minimum value to be stored in an accumulator. The overflow correction circuit in accordance with the present invention also has hardware means for causing a maximum or minimum value to be outputted to an internal data bus, when the data held in the accumulator and overflowing into the overflow margin is outputted to the internal data bus. Accordingly, since the overflow correction circuit in accordance with the present invention requires neither an instruction for discriminating an overflow flag, nor an instruction for substituting a corrected value, the overflow correction circuit can operate at a speed higher than that of the conventional one. Furthermore, even if there occurs an overflow margin exceeding the overflow margin, since the maximum or minimum value is substituted in the accumulator, the data is maintained in the form of an effective data which can be treated as the audio data.

The invention has thus been shown and described with reference to the specific embodiments. However, it should be noted that the present invention is in no way limited to the details of the illustrated structures but changes and modifications may be made within the scope of the appended claims.

We claim:

1. An overflow correction circuit coupled to receive an output of an arithmetic operation circuit, the arithmetic operation circuit having first and second data inputs, the first data input being connected to an internal data bus so as to receive data to be subjected to an arithmetic operation, the output of the arithmetic operation circuit outputting a result of arithmetic operation, the overflow correction circuit comprising a first selector having a first input connected to receive the result of arithmetic operation from the arithmetic operation circuit and a second input and an output, a corrected value generating circuit having an output connected to the second input of the first selector, a first overflow detection circuit coupled to receive a part of the output of the arithmetic operation circuit and for generating a first overflow signal indicative of whether or not there occurs an overflow in the result of the arithmetic operation, the first overflow signal being supplied to the first selector so as to control the first selector in such a manner that when the first overflow signal does not indicate occurrence of the overflow, the first selector outputs the output of the arithmetic operation circuit as its output and when the first overflow signal indicates occurrence of the overflow, the first selector outputs the output of the corrected value generating circuit as its output, and an accumulator having an input connected to receive the output of the first selector and an output connected to the second data input of the arithmetic operation circuit.

2. A circuit claimed in claim 1 wherein the corrected value generating circuit includes a fixed maximum value outputting circuit and a fixed minimum value outputting circuit, and the first selector has the second input connected to an output of the fixed maximum value outputting circuit and a third input connected to an output of the fixed minimum value outputting circuit and wherein the first overflow detection circuit generates an overflow direction signal to the first selector, so that when the first overflow signal indicates occurrence of the overflow, if the overflow direction signal indicates a positive overflow, the first selector selects the second input to output the output of the fixed maximum value outputting circuit as its output, and when the first overflow signal indicates occurrence of the overflow, if the overflow direction signal indicates a negative overflow, the first selector selects the third input to output the output of the fixed minimum value outputting circuit as its output.

3. A circuit claimed in claim 1 wherein the first overflow detection circuit generates an overflow direction signal to the first selector and wherein the corrected value generating circuit is connected to receive the overflow direction signal and generates a maximum value when the overflow direction signal indicates a positive overflow and a minimum value when the overflow direction signal indicates a negative overflow.

4. A circuit claimed in claim 1 wherein the first overflow detection circuit is configured to generate the active overflow signal by detecting inversion of polarity in the most significant bit of the output of the arithmetic operation circuit before and after the execution of the arithmetic operation.

5. A circuit claimed in claim 1 further including a second overflow detection circuit coupled to the output of the accumulator for generating a second overflow signal representative of whether or not the output of the accumulator overflows in comparison with a data length of the internal data bus, and a second selector having a first input connected to the output of the accumulator, and a second input connected to the corrected value generating circuit to receive a corrected value having a data length corresponding to the data length of the internal data bus, the second overflow signal being supplied to the second selector so as to control the second selector in such a manner that when the second overflow signal does not indicate occurrence of the overflow, the second selector outputs the output of the accumulator as its output and when the second overflow signal indicates occurrence of the overflow, the second selector outputs the output of the corrected value generating circuit as its output.

6. A circuit claimed in claim 5 wherein the second overflow detection circuit is configured to generate the active overflow signal by detecting inversion of polarity in the bits corresponding to the most significant bit of the internal data bus and exceeding the data length of the internal data bus.

7. A circuit claimed in claim 1 wherein the first overflow detection circuit coupled to the output of the arithmetic operation circuit for generating a second overflow signal representative of whether or not the output of the accumulator overflows in comparision with a data length of the internal data bus, and a second selector having a first input connected to the output of the accumulator, and a second input connected to the corrected value generating circuit to receive a corrected value having a data length corresponding to the data length of the internal data bus, the second overflow signal being supplied to the second selector so as to control the second selector in such a manner that when the second overflow signal does not indicate occurrence of the overflow, the second selector outputs the output of the accumulator as its output and when the second overflow signal indicates occurrence of the overflow, the second selector outputs the output of the corrected value generating circuit as its output.

8. A circuit claimed in claim 7 wherein the first overflow detection circuit is configured to generate the active overflow signal by detecting inversion of polarity in the bits corresponding to the most significant bit of the internal data bus and exceeding the data length of the internal data bus.

9. An overflow correction circuit coupled to receive an output of an arithmetic operation circuit, the arithmetic operation circuit having first and second data inputs, the first data input being connected to an internal data bus so as to receive data to be subjected to an arithmetic operation, the output of the arithmetic operation circuit outputting a result of arithmetic operation, the overflow correction circuit comprising an accumulator having an input connected to receive the output of the arithmetic operation circuit and an output connected to the second data input of the arithmetic operation circuit, a first selector having a first input connected to receive the output of the accumulator and a second input and an output, a corrected value generating circuit having an output connected to the second input of the first selector, a first overflow detection circuit coupld to receive a part of the output of the arithmetic operation circuit and for generating a first overflow signal indicative of whether or not the data held in the accumulator overflows to exceed a data length of the internal data bus, the first overflow signal being supplied to the first selector so as to control the first selector in such a manner that when the first overflow signal does not indicate occurrence of the overflow, the first selector outputs the output of the accumulator as its output and when the first overflow signal indicates occurence of the overflow, the first selector outputs the output of the corrected value generating circuit as its output.

10. A circuit claimed in claim 9 further including a second selector having a first input connected to receive the result of arithmethic operation from the arithmetic operation circuit and a second input connected to the corrected value generating circuit, an output of the second selector being connected to the accumulator, and a second overflow detection circuit coupled to receive the output of the arithmetic operation circuit and for generating a second overflow signal indicative of whether or not there occurs an overflow in the result of the arithmetic operation, the second overflow signal being supplied to the second selector so as to control the second selector in such a manner that when the second overflow signal does not indicate occurrence of the overflow, the second selector outputs the output of the arithmetic operation circuit as its output and when the second overflow signal indicates occurrence of the overflow, the second selector outputs the output of the corrected value generating circuit as its output.

* * * * *